United States Patent
Bauer et al.

[11] 3,862,136
[45] Jan. 21, 1975

[54] 2-HALO-5-PHENYL-4H-3,5-DIHYDRO-1,5-BENZODIAZEPIN-4-ONES AND SALTS THEREOF

[75] Inventors: Adolf Bauer, Ingelhelm/Rhein; Karl Heinz Weber; Klaus Minck, both of Gau-Algesheim; Peter Danneberg, Ingelheim/Rhein, all of Germany

[73] Assignee: Boehringer Ingelheim G.m.b.H., Ingelheim, Germany

[22] Filed: Oct. 29, 1971

[21] Appl. No.: 194,001

[30] Foreign Application Priority Data
Nov. 2, 1970  Germany............................ 2053680

[52] U.S. Cl.......... 260/239.3 B, 424/244, 424/250, 424/267
[51] Int. Cl............................................. C07d 53/04
[58] Field of Search .............................. 260/239.3 B

[56] References Cited
UNITED STATES PATENTS
3,321,468  5/1967  Krapcho et al................ 260/239.3 B
3,644,374  2/1972  Buijle et al..................... 260/293.88

OTHER PUBLICATIONS
Buyle et al, "Tetrahedron," Vol. 25, pp. 3453–3459, (1969).

*Primary Examiner*—Henry R. Jiles
*Assistant Examiner*—Robert T. Bond
*Attorney, Agent, or Firm*—Hammond & Littell

[57] ABSTRACT
Compounds of the formula

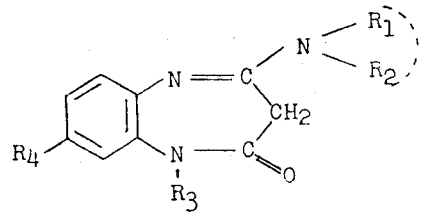

wherein
$R_1$ and $R_2$, which may be identical to or different from each other, are each hydrogen, straight or branched alkyl of 1 to 4 carbon atoms, di-lower alkylamino-(alkyl of 1 to 4 carbon atoms), hydroxy-(alkyl of 1 to 4 carbon atoms), alkenyl of 2 to 4 carbon atoms or, together with each other and the nitrogen atom to which they are attached, form a 6-membered saturated heterocyclic ring which may optionally have a methyl or tolyl substituent attached thereto,
$R_3$ is phenyl, o-halo-phenyl, o-nitro-phenyl or o-trifluoromethyl-phenyl, and
$R_4$ is halogen, nitro or trifluoromethyl,
and non-toxic, pharmacologically acceptable acid addition salts thereof; the compounds as well as their salts are useful as tranquilizers.

1 Claim, No Drawings

2-HALO-5-PHENYL-4H-3,5-DIHYDRO-1,5-BENZODIAZEPIN-4-ONES AND SALTS THEREOF

This invention relates to novel 2-amino-5-phenyl-4H-3,5-dihydro-1,5-benzodiazepin-4-ones and non-toxic, pharmacologically acceptable acid addition salts thereof, as well as to a method of preparing these compounds.

More particularly, the present invention relates to a novel class of compounds represented by the formula

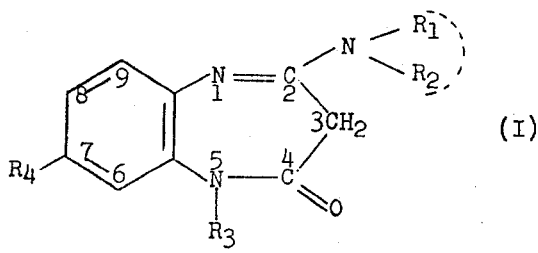

wherein $R_1$ and $R_2$, which may be identical to or different from each other, are each hydrogen, straight or branched alkyl of 1 to 4 carbon atoms, di-lower alkylamino-(alkyl of 1 to 4 carbon atoms), hydroxy-(alkyl of 1 to 4 carbon atoms), alkenyl of 2 to 4 carbon atoms or, together with each other and the nitrogen atom to which they are attached, form a 6-membered saturated heterocyclic ring which may optionally have a methyl or tolyl substituent attached thereto, $R_2$ is phenyl, o-halo-phenyl, o-nitro-phenyl or o-trifluoromethyl-phenyl, and $R_4$ is halogen, nitro or trifluoromethyl, and non-toxic, pharmacologically acceptable acid addition salts thereof.

The compounds embraced by formula I above may be prepared by reacting a compound of the formula

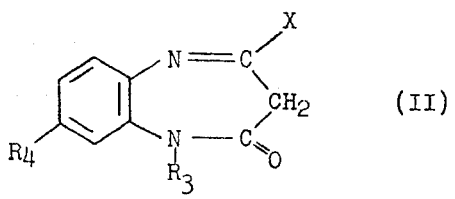

wherein $R_3$ and $R_4$ have the same meaning as in formula I, and X is halogen, $-OR_5$ or $-SR_5$, where $R_5$ is alkyl of 1 to 4 carbon atoms, with an amine of the formula

wherein $R_1$ and $R_2$ have the same meanings as in formula I.

More particularly, the reaction is carried out by first dissolving the starting compound of the formula II in an inert organic solvent, such as diethyleneglycol diethyl ehter, dioxane or tetrahydrofuran, and either introducing into the solution the gaseous amine or adding to the solution the liquid amine or a solution of the amine of the formula III. Depending upon the particular starting compound, the addition of the amine is carried out while cooling the solution, at room temperature or at a moderately elevated temperature.

If a compound of the formula I is to be prepared wherein $R_1$ and $R_2$ have the same meanings as in formula I except the heterocyclic ring, such a compound may also be prepared by reacting the starting compound of the formula II in the above-described manner with ammonia and subsequently alkylating or dialkylating the resulting primary amino group in the 2-position by conventional methods with an alkylating agent, such as an alkyl halide, an alkyl sulfate or a dialkyl sulfate, or by means of the Leuckart-Wallach Reaction [see Berichte 18, 2341 (1885), and Annalen 272, 100 (1892)].

The starting compounds of the formula II are also new; those wherein X is halogen may be prepared by reacting a compound of the formula

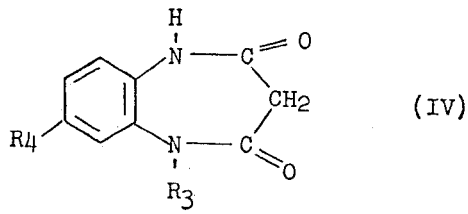

wherein $R_3$ and $R_4$ have the same meanings as in formula I, with an inorganic acid halide, preferably a phosphorus pentahalide, in the presence of an anhydrous inert organic solvent, such as dioxane, at a temperature between about $-50°$ and $+50°C$. Those compounds of the formula II wherein X is $-SR_5$ or $-OR_5$, as defined above, may be obtained by selective conversion of the keto-group in the 2-position of the corresponding compound of the formula IV into the thiol group followed by alkylation, or by reacting a compound of the formula IV with the corresponding trialkyloxonium fluoroborate, as described in our copending application filed concurrently herewith and entitled "2-(Alkoxy or Alkylmercapto)-5-Phenyl-4H-3,5-Dihydro-1,5-Benzodiazepin-4-ones."

However, a compound of the formula II wherein X is $-OR_5$ or $-SR_5$, as defined above, may also be prepared by reacting a corresponding compound of the formula II wherein X is halogen with a corresponding alkanol or alkylmercaptan, respectively.

If the starting compound in the above process for the preparation of a compound of the formula I is a corresponding compound of the formula II wherein X is halogen, it is not necessary to isolate it from the reaction solution resulting from the reaction between the compound of the formula IV and the phosphorus pentahalide; the reaction with the amine of the formula III may be carried out in this reaction solution containing the imide halide.

The compounds of the formula I are organic bases and therefore form acid addition salts with inorganic or organic acids. Examples of non-toxic, pharmacologically acceptable acid addition salts are those formed with a hydrohalic acid, sulfuric acid, methanesulfonic acid, toluenesulfonic acid, 8-chlorotheophylline or the like.

Specific examples of end products of the formula I or non-toxic acid addition salts thereof which are obtained by the above-described procedures are the following:

2-amino-7-bromo-5-phenyl-4H-3,5-dihydro-1,5-benzodiazepin-4-one,
2-amino-7-chloro-5-phenyl-4H-3,5-dihydro-1,5-benzodiazepin-4-one,
2-amino-5-phenyl-7-trifluoromethyl-4H-3,5-dihydro-1,5-benzodiazepin-4-one,
2-amino-5-o-chlorophenyl-7-chloro-4H-3,5-dihydro-1,5-benzodiazepin-4-one,
2-amino-7-chloro-5-o-fluorophenyl-4H-3,5-dihydro-1,5-benzodiazepin-4-one,
2-amino-7-nitro-5-phenyl-4H-3,5-dihydro-1,5-benzodiazepin-4-one,
2-amino-7-fluoro-5-phenyl-4H-3,5-dihydro-1,5-benzodiazepin-4-one,
2-methylamino-5-phenyl-7-trifluoromethyl-4H-3,5-dihydro-1,5-benzodiazepin-4-one,
7-chloro-2-methylamino-5-phenyl-4H-3,5-dihydro-1,5-benzodiazepin-4-one,
5-o-chlorophenyl-7-chloro-2-methylamino-4H-3,5-dihydro-1,5-benzodiazepin-4-one,
2-methylamino-7-nitro-5-phenyl-4H-3,5-dihydro-1,5-benzodiazepin-4-one,
7-chloro-2-methylamino-5-o-nitrophenyl-4H-3,5-dihydro-1,5-benzodiazepin-4-one,
7-bromo-2-methylamino-5-o-trifluoromethylphenyl-4H-3,5-dihydro-1,5-benzodiazepin-4-one,
2-ethylamino-7-nitro-5-phenyl-4H-3,5-dihydro-1,5-benzodiazepin-4-one,
2-ethylamino-7-chloro-5-phenyl-4H-3,5-dihydro-1,5-benzodiazepin-4-one,
2-ethylamino-5-phenyl-7-trifluoromethyl-4H-3,5-dihydro-1,5-benzodiazepin-4-one,
2-tert.butylamino-7-chloro-5-phenyl-4H-3,5-dihydro-1,5-benzodiazepin-4-one,
7-chloro-2-isopropylamino-5-phenyl-4H-3,5-dihydro-1,5-benzodiazepin-4-one,
2-isopropylamino-5-phenyl-7-trifluoromethyl-4H-3,5-dihydro-1,5-benzodiazepin-4-one,
2-isopropylamino-7-nitro-5-phenyl-4H-3,5-dihydro-1,5-benzodiazepin-4-one,
2-n-butylamino-7-chloro-5-phenyl-4H-3,5-dihydro-1,5-benzodiazepin-4-one,
2-(β-hydroxyethyl-amino)-7-nitro-5-phenyl-4H-3,5-dihydro-1,5-benzodiazepin-4-one,
7-chloro-2-(methoxypropyl-amino)-5-phenyl-4H-3,5-dihydro-1,5-benzodiazepin-4-one,
2-(β-hydroxyethyl-amino)-5-phenyl-7-trifluoromethyl-4H-3,5-dihydro-1,5-benzodiazepin-4-one,
7-chloro-2-dimethylamino-5-phenyl-4H-3,5-dihydro-1,5-benzodiazepin-4-one,
2-dimethylamino-5-phenyl-7-trifluoromethyl-4H-3,5-dihydro-1,5-benzodiazepin-4-one,
2-Dimethylamino-7-nitro-5-phenyl-4H-3,5-dihydro-1,5-benzodiazepin-4-one,
7-chloro-2-(N-methyl-ethylamino)-5-phenyl-4H-3,5-dihydro-1,5-benzodiazepin-4-one,
7-chloro-2-diallylamino-5-phenyl-4H-3,5-dihydro-1,5-benzodiazepin-4-one,
2-(β-dimethylaminoethyl-amino)-5-phenyl-7-trifluoromethyl-4H-3,5-dihydro-1,5-benzodiazepin-4-one,
2-(β-diethylaminoethyl-amino)-7-nitro-5-phenyl-4H-3,5-dihydro-1,5-benzodiazepin-4-one,
7-chloro-2-(β-diethylaminoethyl-amino)-5-phenyl-4H-3,5-dihydro-1,5-benzodiazepin-4-one,
5-phenyl-2-piperidino-7-trifluoromethyl-4H-3,5-dihydro-1,5-benzodiazepin-4-one,
7-nitro-5-phenyl-2-piperidino-4H-3,5-dihydro-1,5-benzodiazepin-4-one,
7-chloro-2-(N'-methyl-piperazino)-5-phenyl-4H-3,5-dihydro-1,5-benzodiazepin-4-one, and
2-[N'-(o-methylphenyl)-piperazino]-7-nitro-5-phenyl-4H-3,5-dihydro-1,5-benzodiazepin-4-one.

The following examples further illustrate the present invention and will enable others skilled in the art to understand it more completely. It should be understood, however, that the invention is not limited solely to the particular examples given below.

EXAMPLE 1

2-Amino-7-chloro-5-phenyl-4H-3,5-dihydro-1,5-benzodiazepin-4-one and its hydrochloride A solution of 15 gm of 7-chloro-5-phenyl-4H-3,5-dihydro-1,5-benzodiazepin-2,4-dione in 500 ml of dry diethyleneglycol dimethylether was admixed at 15°C. with 40 gm of phosphorus pentachloride and 0.4 ml of dimethylformamide, and the mixture was allowed to stand for 30 minutes. Thereafter, the reaction solution was poured into a solution of dry ammonia in methanol, the mixed solution was diluted with water and extracted three times with methylene chloride, and the combined extracts were evaporated in vacuo. The residue was dissolved in 60 ml of absolute acetone, the solution was acidified with an excess of ethereal hydrochloric acid, ether was added to the acid solution, and the precipitate formed thereby, the hydrochloride of 2-amino-7-chloro-5-phenyl-4H-3,5-dihydro-1,5-benzodiazepin-4-one, was collected by vacuum filtration. The filter cake was washed with ether and suspended in water, the aqueous suspension was made alkaline with ammonia and then extracted with ethyl acetate, and the product was crystallized out by addition of ether, yielding 5.8 gm (39 percent of theory) of the compound of the formula

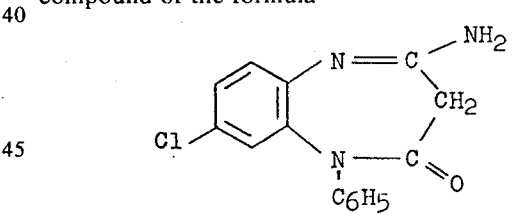

having a melting point of 242°–243°C.

EXAMPLE 2

2-Amino-7-bromo-5-phenyl-4H-3,5-dihydro-1,5-benzodiazepin-4-one, its hydrochloride and its methanesulfonate 13 gm of 7-bromo-5-phenyl-1H-2,3,4,5-tetrahydro-1,5-benzodiazepine-2,4-dione were dissolved in one liter of hot dioxane, the solution was allowed to cool to 15°C., and then, while stirring the solution, 50 gm of phosphorus pentabromide were added thereto. The mixture was allowed to react for 30 minutes, and then, while cooling and stirring, a vigorous stream of dry ammonia was passed therethrough until the resulting suspension reacted alkaline, taking care that the temperature did not rise above 20°C. Subsequently, the suspension was evaporated in vacuo, the residue was admixed with aqueous ammonia, the resulting mixture was extracted several times with methylene chloride, and the combined extracts were washed with water until neutral, dried with magnesium sulfate and evaporated in vacuo. The residue was taken up in acetone, the resulting solution was acidified with ethereal hydrochloric acid, and the precipitate formed thereby, i.e., the hydrochloride of 2-amino-7-bromo-5-phenyl-4H-3,5-dihydro-1,5-benzodiazepin-4-one, was collected by vacuum filtration. The filter cake was washed with ether and suspended in aqueous ammonia, the suspension was extracted with methylene chloride, the extract solution was dried with magnesium sulfate and evaporated, and the residue was recrystallized from isopropyl ether, yielding 8.2 gm (63 percent of theory) of the compound of the formula

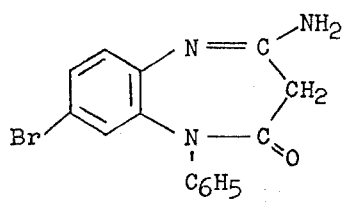

having a melting point of 248°–249°C.

Its methanesulfonate had a melting point of 276°–277.5°C.

EXAMPLE 3

2-Amino-5-phenyl-7-trifluoromethyl-4H-3,5-dihydro-1,5-benzodiazepin-4-one, its hydrochloride and its methanesulfonate A solution of 13 gm of 5-phenyl-7-trifluoromethyl-1H-2,3,4,5-tetrahydro-1,5-benzodiazepine-2,4-dione in 700 ml of dioxane was reacted with 50 gm of phosphorus pentachloride and ammonia, as described in Example 2. The reaction mixture was worked up by adding about 300 ml of water until the precipitated inorganic salts were redissolved, extracting the aqueous mixture with methylene chloride, precipitating the hydrochloride of 2-amino-5-phenyl-7-trifluoromethyl4H-3,5-dihydro-1,5-benzodiazepin-4-one, m.p. 282°–283°C., from the methylene chloride phase with ethereal hydrochloric acid (yield: 8.5 gm = 58 percent of theory) and liberating the free base, m. p. 227°–228°C. (recrystallized from ether), of the formula

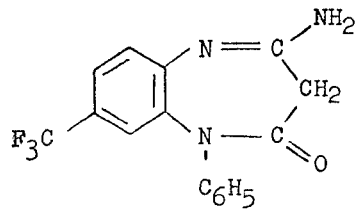

in a manner analogous to Example 2.

Its methane sulfonate had a melting point of 247°–249°C.

EXAMPLE 4

2-Ethylamino-5-phenyl-7-nitro-4H-3,5-dihydro-1,5-benzodiazepin-4-one 2.0 gms of 2-methylmercapto-5-phenyl-7-nitro-4H-3,5-dihydro-1,5-benzodiazepin-4-one were suspended in a mixture of 50 ml of ethanol and 5 ml of dimethylsulfoxide. While refluxing and stirring the suspension for 20 minutes, a vigorous stream of gaseous ethylamine was passed therethrough, and then the resulting deep red solution was evaporated in vacuo. The residue was taken up in methylene chloride, the resulting solution was washed with water, dried over magnesium sulfate and evaporated, and the residue was recrystallized from ethanol, yielding 1.8 gm (91 percent of theory) of the compound of the formula

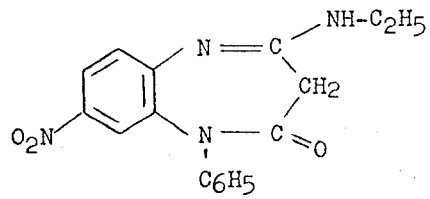

having a melting point of 243°–245°C.

EXAMPLE 5

2-Methylamino-5-phenyl-7-trifluoromethyl-4H-3,5-dihydro-1,5-benzodiazepin-4-one 1.2 gm of 2-ethoxy-5-phenyl-7-trifluoromethyl-4H-3,5-dihydro-1,5-benzodiazepin-4-one were dissolved in a mixture of 30 ml of ethanol and 5 ml of dimethylsulfoxide, and, while stirring and refluxing the solution for six hours, a gentle stream of gaseous methylamine was passed therethrough. Thereafter, the reaction solution was allowed to cool to room temperature, was then saturated with gaseous methylamine, and was allowed to stand at room temperature for 15 hours. Subsequently, the reaction solution was evaporated, the residue was taken up in methylene chloride, and the resulting solution was washed twice with water, dried over magnesium sulfate and evaporated. The residue was recyrstallized from a small amount of isopropyl ether, yielding 1.1 gm (95.5 percent of theory) of the compound of the formula

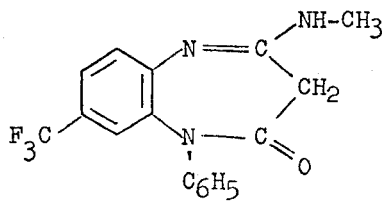

having a melting point of 202°–203°C.

EXAMPLE 6

2-Tert butylamino-7-chloro-5-phenyl-4H-3,5-dihydro-1,5-benzodiazepin-4-one 15 gm of 7-chloro-5-phenyl-1H-2,3,4,5-tetrahydro-1,5-benzodiazepine-2,4-dione in 750 ml of dioxane were stirred with 50 gm of phosphorus pentachloride, as described in Example 2, the reaction mixture was introduced into an excess of tert.butylamine on an ice bath, and the mixture was allowed to stand for 30 minutes. Thereafter, ice water was added, the aqueous mixture was admixed with 50 ml of ammonia, and the alkaline mixture was extracted with methylene chloride. The methylene chloride phase was washed with water, dried over magnesium sulfate and evaporated, and the residue was crystallized from methanol, yielding 14.3 gm (80.5 percent of theory) of the compound of the formula

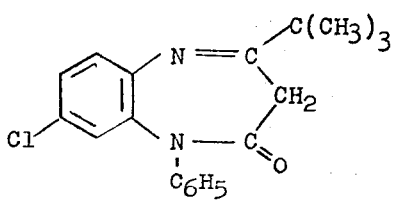

having a melting point of 275°–276°C.

EXAMPLE 7

2-Dimethylamino-5-phenyl-7-nitro-4H-3,5-dihydro-1,5-benzodiazepin-4-one 2 gm of 2-amino-5-phenyl-7-nitro-4H-3,5-dihydro-1,5-benzodiazepin-4-one, 5 ml of methyl iodide and 1 gm of sodium methylate were dissolved in 30 ml of dimethylacetamide, and the ensuing exothermic reaction was interrupted after 30 minutes. Thereafter, the reaction solution was evaporated, the residue was taken up in ethyl acetate, and the resulting solution was extracted with water. The organic phase was dried with magnesium sulfate and then evaporated, and the residue was recrystallized from ether, yielding 87 percent of theory of the compound of the formula

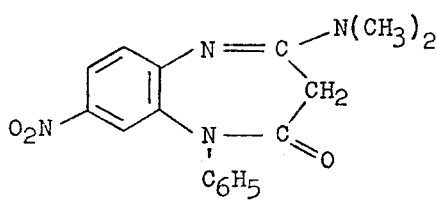

having a melting point of 219°–220°C.

EXAMPLE 8

Using a procedure analogous to that described in Example 1, 2-amino-5-(o-chloro-phenyl)-7-chloro-4H-3,5-dihydro-1,5-benzodiazepin-4-one, m. p. 260°–262°C., of the formula

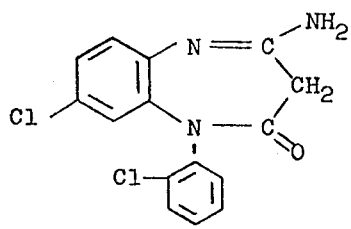

was prepared from 5-(o-chloro-phenyl)-7-chloro-1H-2,3,4,5-tetrahydro-1,5-benzodiazepine-2,4-dione.

EXAMPLE 9

Using a procedure analogous to that described in Example 1, 2-amino-5-(o-fluoro-phenyl)-7-chloro-4H-3,5-dihydro-1,5-benzodiazepin-4-one, m. p. 256°–257°C., of the formula

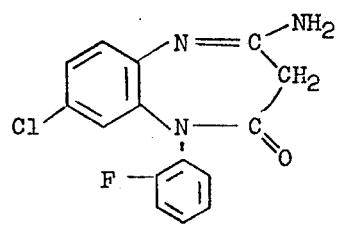

was prepared from 5-(o-fluoro-phenyl)-7-chloro-1H-2,3,4,5-tetrahydro-1,5-benzodiazepine-2,4-dione.

EXAMPLE 10

Using a procedure analogous to that described in Example 1, 2-amino-5-phenyl-7-nitro-4H-3,5-dihydro-1,5-benzodiazepin-4-one, m. p. 219°–220°C., of the formula

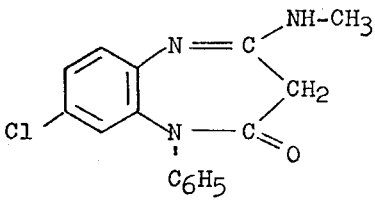

was prepared from 5-phenyl-7-nitro-1H-2,3,4,5-tetrahydro-1,5-benzodiazepine-2,4-dione.

EXAMPLE 11

Using a procedure analogous to that described in Example 1, 2-amino-5-phenyl-7-fluoro-4H-3,5-dihydro-1,5-benzodiazepin-4-one, m. p. 222°–224°C., of the formula

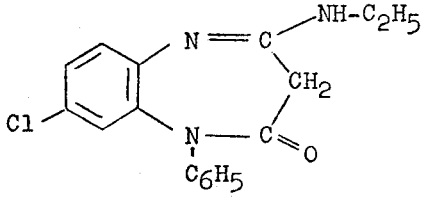

was prepared from 5-phenyl-7-fluoro-1H-2,3,4,5-tetrahydro-1,5-benzodiazepine-2,4-dione.

EXAMPLE 12

Using a procedure analogous to that described in Example 5, 2-methylamino-5-phenyl-7-chloro-4H-3,5-dihydro-1,5-benzodiazepin-4-one, m. p. 218°–219°C., of the formula was prepared from 2-ethoxy-5-phenyl-7-chloro-4H-3,5-dihydro-1,5-benzodiazepin-4-one and methylamine.

EXAMPLE 13

Using a procedure analogous to that described in Example 4, 2-ethylamino-5-phenyl-7-chloro-4H-3,5-dihydro-1,5-benzodiazepin-4-one, m. p. 183°–184°C., of the formula was prepared from 2-methylmercapto-5-phenyl-7-chloro-4H-3,5-dihydro-1,5-benzodiazepin-4-one and ethylamine.

EXAMPLE 14

Using a procedure analogous to that described in Example 6, 2-isopropylamino-5-phenyl-7-chloro-4H-3,5-dihydro-1,5-benzodiazepin-4-one, m. p. 240°–241°C., of the formula

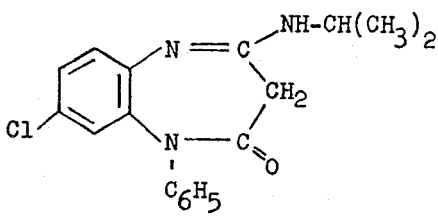

was prepared from 5-phenyl-7-chloro-1H-2,3,4,5-tetrahydro-1,5-benzodiazepine-2,4-dione and isopropylamine.

EXAMPLE 15

Using a procedure analogous to that described in Example 7, 2-dimethylamino-5-phenyl-7-chloro-4H-3,5-dihydro-1,5-benzodiazepin-4-one, m. p. 142°–145°C., of the formula

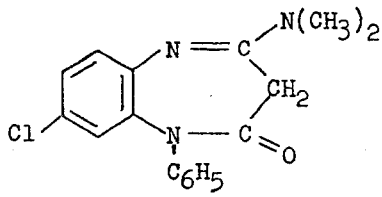

was prepared from 2-amino-5-phenyl-7-chloro-4H-3,5-dihydro-1,5-benzodiazepin-4-one and dimethylacetamide.

EXAMPLE 16

Using a procedure analogous to that described in Example 5, 2-methylamino-5-(o-chloro-phenyl)-7-chloro-4H-3,5-dihydro-1,5-benzodiazepin-4-one, m. p. 224°–225°C., of the formula

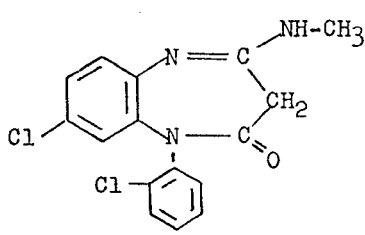

was prepared from 2-ethoxy-5-(o-chloro-phenyl)-7-chloro-4H-3,5-dihydro-1,5-benzodiazepin-4-one and methylamine.

EXAMPLE 17

Using a procedure analogous to that described in Example 7, 2-dimethylamino-5-phenyl-7-trifluoromethyl-4H-3,5-dihydro-1,5-benzodiazepin-4-one, m. p. 277°C. (decomp.), of the formula

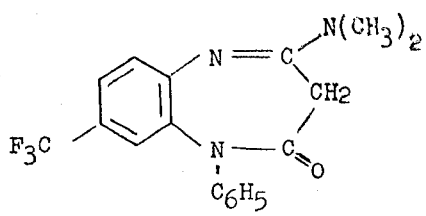

was prepared from 2-amino-5-phenyl-7-trifluoromethyl-4H-3,5-dihydro-1,5-benzodiazepin-4-one and dimethylacetamide.

EXAMPLE 18

Using a procedure analogous to that described in Example 6, 2-(β-hydroxyethyl-amino)-5-phenyl-7-trifluoromethyl-4H-3,5-dihydro-1,5-benzodiazepin-4-one, m. p. 188°–189°C., of the formula

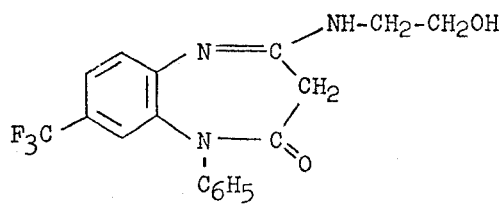

was prepared from 5-phenyl-7-trifluoromethyl-1H-2,3,4,5-tetrahydro-1,5-benzodiazepine-2,4-dione and ethanolamine.

EXAMPLE 19

Using a procedure analogous to that described in Example 6, 2-isopropylamino-5-phenyl-7-trifluoromethyl-4H3,5-dihydro-1,5-benzodiazepin-4-one, m. p. 215°–217°C., of the formula

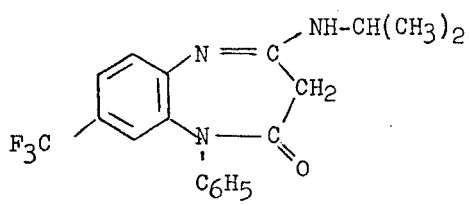

was prepared from 5-phenyl-7-trifluoromethyl-1H-2,3,4,5-tetrahydro-1,5-benzodiazepine-2,4-dione and isopropylamine.

EXAMPLE 20

Using a procedure analogous to that described in Example 4, 2-ethylamino-5-phenyl-7-trifluoromethyl-4H-3,5-dihydro-1,5-benzodiazepin-4-one, m. p. 181°–183°C., of the formula

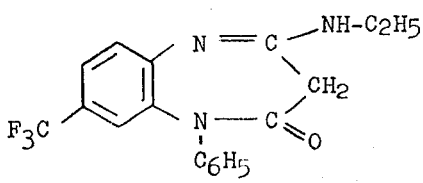

was prepared from 2-methylmercapto-5-phenyl-7-trifluoromethyl-4H-3,5-dihydro-1,5-benzodiazepin-4-one and ethylamine.

EXAMPLE 21

Using a procedure analogous to that described in Example 6, 2-[(β-dimethylamino-ethyl)-amino]-5-phenyl-7-trifluoromethyl-4H-3,5-dihydro-1,5-benzodiazepin-4-one, m. p. 171°–173°C., of the formula

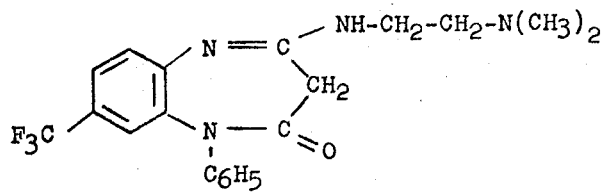

was prepared from 5-phenyl-7-trifluoromethyl-1H-2,3,4,5-tetrahydro-1,5-benzodiazepine-2,4-dione and N,N-dimethylethylenediamine.

EXAMPLE 22

Using a procedure analogous to that described in Example 6, 2-piperidino-5-phenyl-7-trifluoromethyl-4H-3,5-dihydro-1,5-benzodiazepin-4-one, m. p. 144°–146°C., of the formula

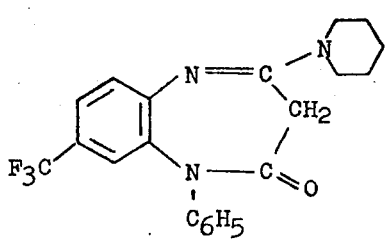

was prepared from 5-phenyl-7-trifluoromethyl-1H-2,3,4,5-tetrahydro-1,5-benzodiazepine-2,4-dione and piperidine.

EXAMPLE 23

Using a procedure analogous to that described in Example 6, 2-isopropylamino-5-phenyl-7-nitro-4H-3,5-dihydro-1,5-benzodiazepin-4-one, m. p. 251°–253°C., of the formula

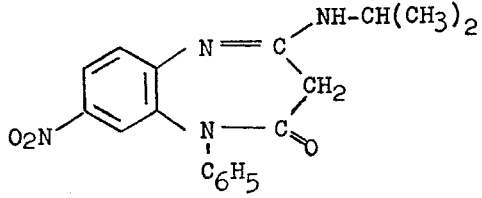

was prepared from 5-phenyl-7-nitro-1H-2,3,4,5-tetrahydro-1,5-benzodiazepine-2,4-dione and isopropylamine.

EXAMPLE 24

Using a procedure analogous to that described in Example 6, 2-piperidino-5-phenyl-7-nitro-4H-3,5-dihydro-1,5benzodiazepin-4-one, m. p. 175°–176°C., of the formula

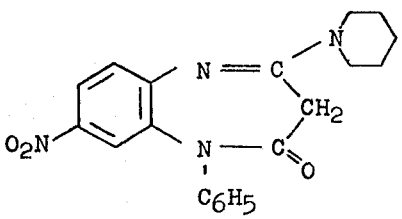

was prepared from 5-phenyl-7-nitro-1H-2,3,4,5-tetrahydro-1,5-benzodiazepine-2,4-dione and piperidine.

EXAMPLE 25

Using a procedure analogous to that described in Example 6, 2-[(β-dimethylamino-ethyl)-amino]-5-phenyl-7-nitro-4H-3,5-dihydro-1,5-benzodiazepin-4-one, m. p. 148°–153°C., of the formula

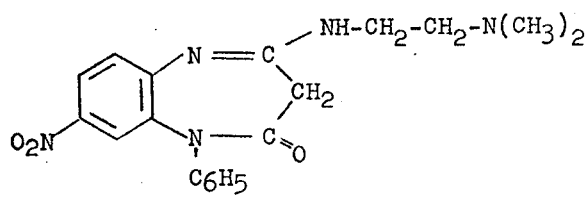

was prepared from 5-phenyl-7-nitro-1H-2,3,4,5-tetrahydro-1,5-benzodiazepine-2,4-dione and N,N-dimethyl-ethylenediamine.

EXAMPLE 26

Using a procedure analogous to that described in Example 6, 2-(N'-o-tolyl-piperazino)-5-phenyl-7-nitro-4H-3,5-dihydro-1,5-benzodiazepin-4-one, m. p. 223°–225°C., of the formula

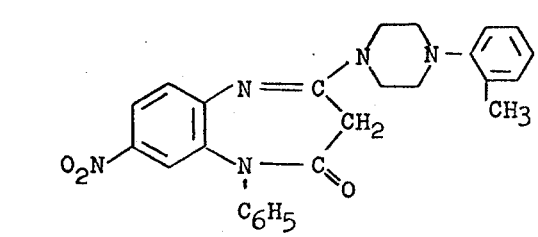

was prepared from 5-phenyl-7-nitro-1H-2,3,4,5-tetrahydro-1,5-benzodiazepine-2,4-dione and N-o-tolyl-piperazine.

EXAMPLE 27

Using a procedure analogous to that described in Example 5, 2-methylamino-5-phenyl-7-nitro-4H-3,5-dihydro-1,5-benzodiazepin-4-one, m. p. 217°–219°C., of the formula

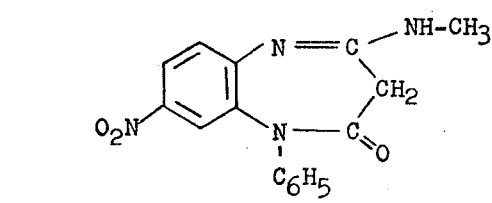

was prepared from 2-ethoxy-5-phenyl-7-nitro-4H-3,5-dihydro-1,5-benzodiazepin-4-one and methylamine.

EXAMPLE 28

Using a procedure analogous to that described in Example 6, 2-(β-hydroxyethyl-amino)-5-phenyl-7-nitro-4H-3,5-dihydro-1,5-benzodiazepin-4-one, m. p. 191°–193°C., of the formula

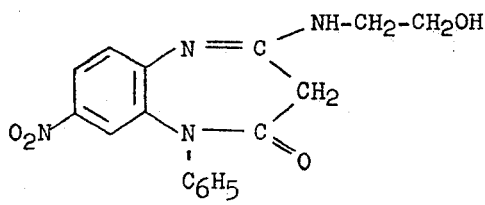

was prepared from 5-phenyl-7-nitro-1H-2,3,4,5-tetrahydro-1,5-benzodiazepin-2,4-one and ethanolamine.

EXAMPLE 29

Using a procedure analogous to that described in Example 6, 2-(N'-methyl-piperazino)-5-phenyl-7-chloro-4H-3,5-dihydro-1,5-benzodiazepin-4-one, m. p. 217°–219°C. (decomp.), of the formula

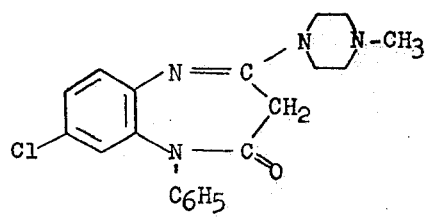

was prepared from 5-phenyl-7-chloro-1H-2,3,4,5-tetrahydro-1,5-benzodiazepine-2,4-dione and N-methyl-piperazine.

EXAMPLE 30

Using a procedure analogous to that described in Example 6, 2-[(β-dimethylamino-ethyl)-amino]-5-phenyl-7-chloro-4H-3,5-dihydro-1,5-benzodiazepin-4-one, m. p. 278°–280°C., of the formula

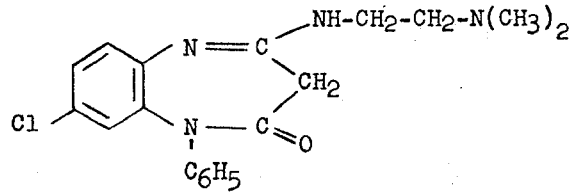

was prepared from 5-phenyl-7-chloro-1H-2,3,4,5-tetrahydro-1,5-benzodiazepine-2,4-dione and N,N-dimethyl-ethylenediamine.

EXAMPLE 31

Using a procedure analogous to that described in Example 6, 2-n-butylamino-5-phenyl-7-chloro-4H-3,5-dihydro-1,5-benzodiazepin-4-one, m. p. 147°–148°C., of the formula

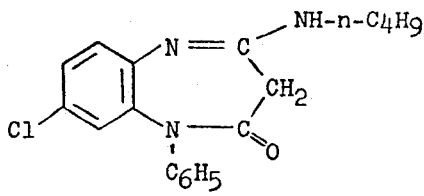

was prepared from 5-phenyl-7-chloro-1H-2,3,4,5-tetrahydro-1,5-benzodiazepine-2,4-dione and n-butylamine.

EXAMPLE 32

Using a procedure analogous to that described in Example 6, 2-n-butylamino-5-(o-trifluoromethyl-phenyl)-7-chloro-4H-3,5-dihydro-1,5-benzodiazepin-4-one, m. p. 184°–185°C., of the formula

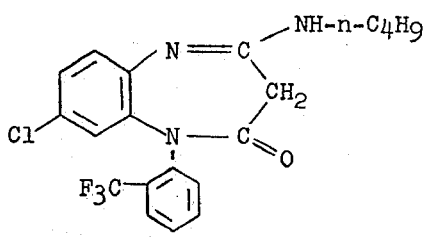

was prepared from 5-(o-trifluoromethyl-phenyl)-7-chloro-1H-2,3,4,5-tetrahydro-1,5-benzodiazepine-2,4-dione and n-butylamine.

EXAMPLE 33

Using a procedure analogous to that described in Example 6, 2-n-butylamino-5-(o-fluoro-phenyl)-7-chloro-4H-3,5-dihydro-1,5-benzodiazepin-4-one, m. p. 200°–202°C., of the formula

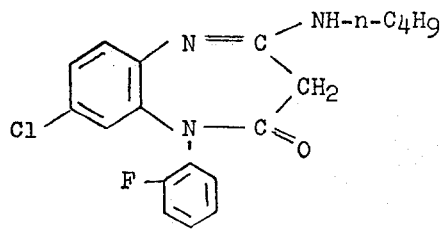

was prepared from 5-(o-fluoro-phenyl)-7-chloro-1H-2,3,4,5-tetrahydro-1,5-benzodiazepine-2,4-dione and n-butylamine.

EXAMPLE 34

Using a procedure analogous to that described in Example 5, 2-methylamino-5-(o-nitro-phenyl)-7-chloro-4H-3,5-dihydro-1,5-benzodiazepin-4-one, m. p. 260°–262°C., of the formula

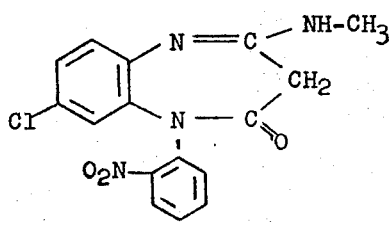

was prepared from 2-ethoxy-5-(o-nitro-phenyl)-7-chloro-4H-3,5-dihydro-1,5-benzodiazepin-4-one and methylamine.

EXAMPLE 35

Using a procedure analogous to that described in Example 6, 2-allylamino-5-phenyl-7-chloro-4H-3,5-dihydro-1,5-benzodiazepin-4-one, m. p. 173°–176°C., of the formula

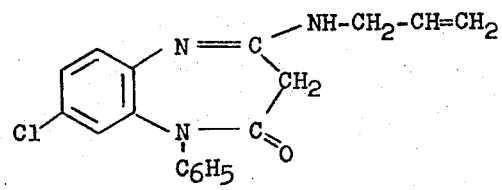

was prepared from 5-phenyl-7-chloro-1H-2,3,4,5-tetrahydro-1,5-benzodiazepine-2,4-dione and allylamine.

EXAMPLE 36

Using a procedure analogous to that described in Example 6, 2-diallylamino-5-phenyl-7-chloro-4H-3,5-dihydro-1,5-benzodiazepin-4-one of the formula

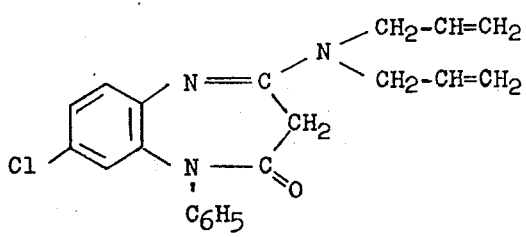

was prepared from 5-phenyl-7-chloro-1H-2,3,4,5-tetrahydro-1,5-benzodiazepine-2,4-dione and diallylamine. Its hydrochloride had a melting point of 200°C. (decomp.).

EXAMPLE 37

Using a procedure analogous to that described in Example 6, 2-(N-n-butyl-ethylamino)-5-phenyl-7-chloro-4H-3,5-dihydro-1,5-benzodiazepin-4-one, m. p. 185°–188°C., of the formula

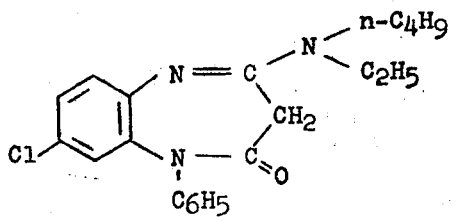

was prepared from 5-phenyl-7-chloro-1H-2,3,4,5-tetrahydro-1,5-benzodiazepine-2,4-dione and N-n-butyl-ethylamine.

EXAMPLE 38

Using a procedure analogous to that described in Example 3, 2-amino-5-phenyl-7-nitro-4H-3,5-dihydro-1,5-benzodiazepin-4-one of the formula

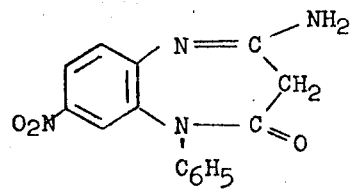

was prepared from 5-phenyl-7-nitro-1H-2,3,4,5-tetrahydro1,5-benzodiazepine-2,4-dione and ammonia. Its methanesulfonate had a melting point of 238°–239.5°C.

The compounds according to the present invention, that is, those embraced by formula I and their non-toxic, pharmacologically acceptable acid addition salts, have useful pharmacodynamic properties. More particularly, the compounds of the instant invention exhibit tranquilizing activities in warm-blooded animals, such as dogs, rats, minks. Particularly effective tranquilizers are those compounds of the formula I wherein $R_1$ is hydrogen or methyl, $R_2$ is hydrogen, methyl or ethyl, $R_3$ is phenyl, and $R_4$ is halogen, nitro or trifluoromethyl, and their non-toxic acid addition salts.

In addition, the compounds of the present invention are useful as intermediates for the preparation of other tranquilizers of the benzodiazepine class.

For pharmaceutical purposes the compounds according to the present invention are administered to warm-blooded animals perorally or parenterally as active ingredients in customary pharmaceutical dosage unit compositions, that is, compositions in dosage unit form consisting essentially of an inert pharmaceutical carrier and one effective dosage unit of the active ingredient, such as tablets, coated pills, capsules, wafers powders, solutions, suspensions, emulsions, syrups, suppositories and the like. One effective tranquilizing dosage unit of the compounds according to the present invention is from 0.0083 to 0.84 mgm/kg body weight, preferably from 0.0166 to 0.42 mgm/kg, and the preferred daily dose is from 0.083 to 2.5 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 39

Coated Pills

The pill core composition is compounded from the following ingredients:

| | | |
|---|---|---|
| 2-Amino-5-phenyl-7-trifluoromethyl-4H-3,5-dihydro-1,5-benzodiazepin-4-one . HCl | 5.0 | parts |
| Lactose | 28.5 | do. |
| Corn starch | 15.0 | do. |
| Gelatin | 1.0 | do. |
| Magnesium stearate | 0.5 | do. |
| Total | 50.0 | parts |

Preparation:

The benzodiazepinone compound is intimately admixed with the lactose and the corn starch, the mixture is moistened with an aqueous 10 percent solution of the gelatin, the moist mass is forced through a 1 mm-mesh screen, the resulting granulate is dried at 40°C. and again passed through the screen, the dry granulate is admixed with the magnesium stearate, and the composition is compressed into 50 mgm-pill cores which are subsequently coated in conventional manner with a thin shell consisting essentially of a mixture of sugar, titanium oxide, talcum and gum arabic, and finally polished with beeswax. Each coated pill contains 5 mgm of the benzodiazepinone compound and is an oral dosage unit composition with effective tranquilizing action.

The same result is obtained when an equal amount of one of the following 4H-3,5-dihydro-1,5-benzodiazepin-4-ones is substituted for the benzodiazepinone compound in the above pill core composition:

2-Amino-7-bromo-5-phenyl-4H-3,5-dihydro-1,5-benzodiazepin-4-one;
2-Amino-7-nitro-5-phenyl-4H-3,5-dihydro-1,5-benzodiazepin-4-one;
2-Methylamino-5-phenyl-7-trifluoromethyl-4H-3,5-dihydro-1,5-benzodiazepin-4-one;
2-Dimethylamino-5-phenyl-7-trifluoromethyl-4H-3,5-dihydro-1,5-benzodiazepin-4-one; or
2-Ethylamino-5-phenyl-7-trifluoromethyl-4H-3,5-dihydro-1,5-benzodiazepin-4-one.

EXAMPLE 40

Suppositories

The suppository composition is compounded from the following ingredients:

| | | |
|---|---|---|
| 2-Amino-5-phenyl-7-bromo-4H-3,5-dihydro-1,5-benzodiazepin-4-one | 5.0 parts | |
| Suppository base (e.g. cocoa butter) | 1695.0 do. | |
| Total | 1700.0 parts | |

Preparation:

The finely pulverized benzodiazepinone compound is blended with the aid of an immersion homogenizer into the suppository base which had previously been melted and cooled to 40°C. 1700 mgm-portions of the resulting composition are poured at 35°C. into cooled suppository molds and allowed to harden. Each suppository contains 5 mgm of the benzodiazepinone compound and is a rectal dosage unit composition with effective tranquilizing action.

The same result is obtained when an equal amount of 2-amino-7-nitro-5-phenyl-4H-3,5-dihydro-1,5-benzodiazepin-4-one is substituted for the benzodiazepinone compound in the above suppository composition.

Analogous results are obtained when any one of the other compounds embraced by formula I or a non-toxic acid addition salt thereof is substituted for the particular benzodiazepinone in Examples 39 and 40. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

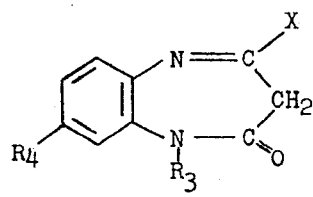

wherein $R_3$ is phenyl, o-halo-phenyl, o-nitro-phenyl or o-trifluoromethyl-phenyl,
$R_4$ is halogen, nitro or trifluoromethyl, and
X is chlorine or bromine.

* * * * *